May 10, 1932.  J. W. TATTER  1,857,413
FLUID OPERATED APPARATUS
Filed Aug. 8, 1927   8 Sheets-Sheet 1

Witness:
William P. Kilroy

Inventor
John W. Tatter

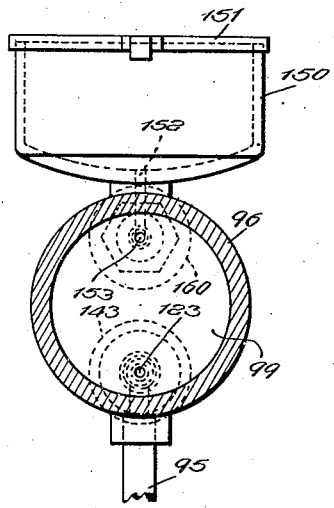
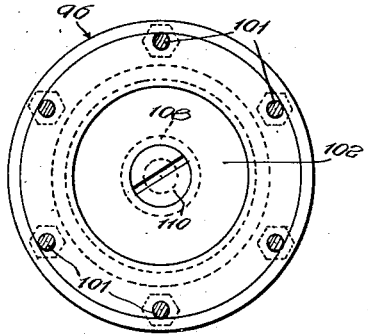
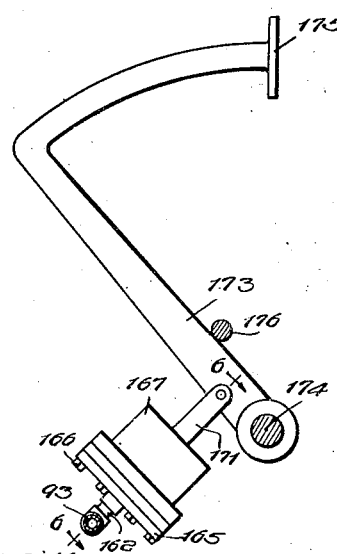
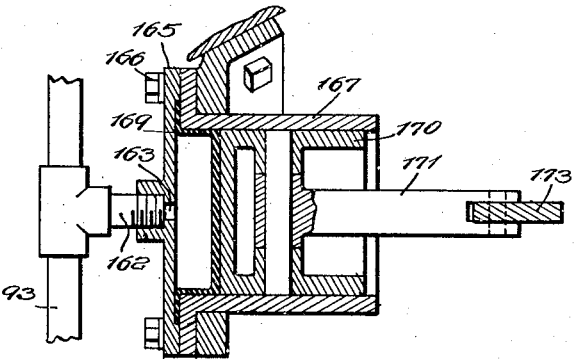

May 10, 1932.  J. W. TATTER  1,857,413
FLUID OPERATED APPARATUS
Filed Aug. 8, 1927  8 Sheets-Sheet 4
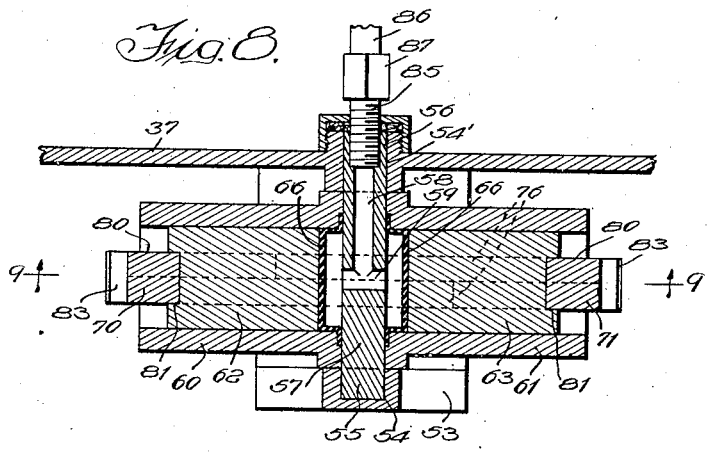
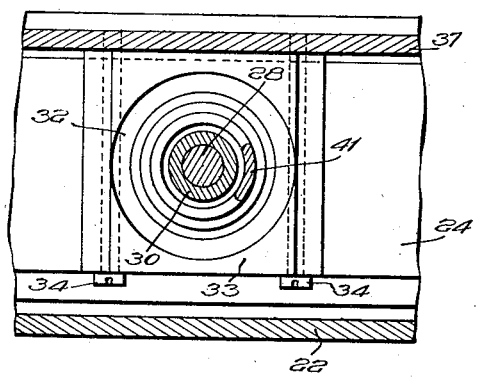
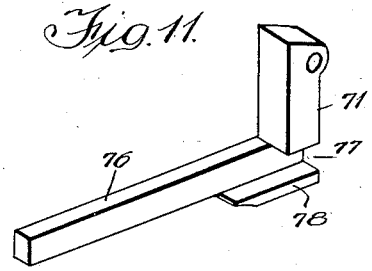
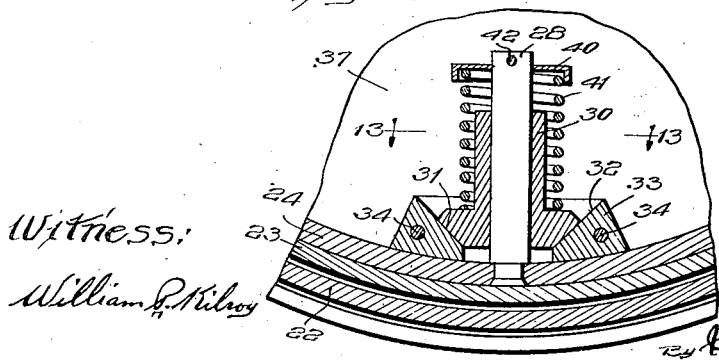
Witness:
William P. Kilroy
Inventor:
John W. Tatter

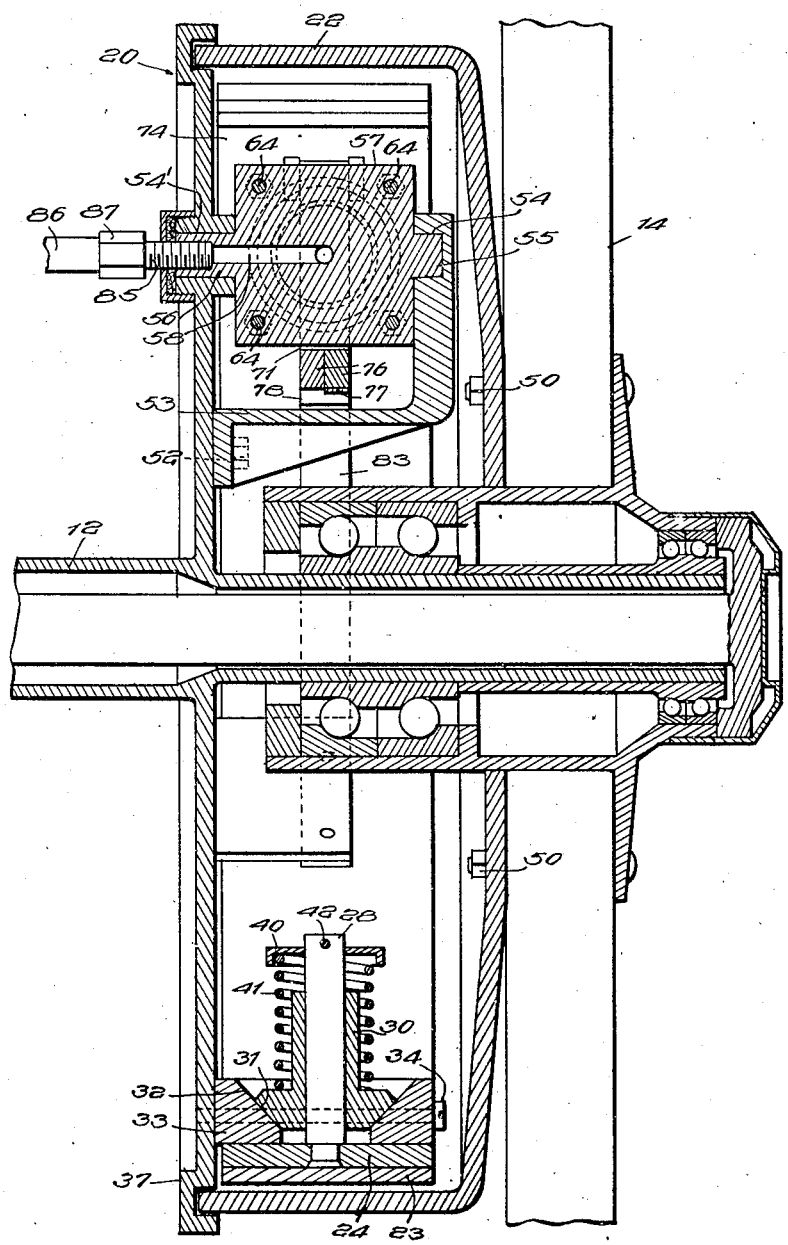

May 10, 1932.  J. W. TATTER  1,857,413
FLUID OPERATED APPARATUS
Filed Aug. 8, 1927    8 Sheets-Sheet 6
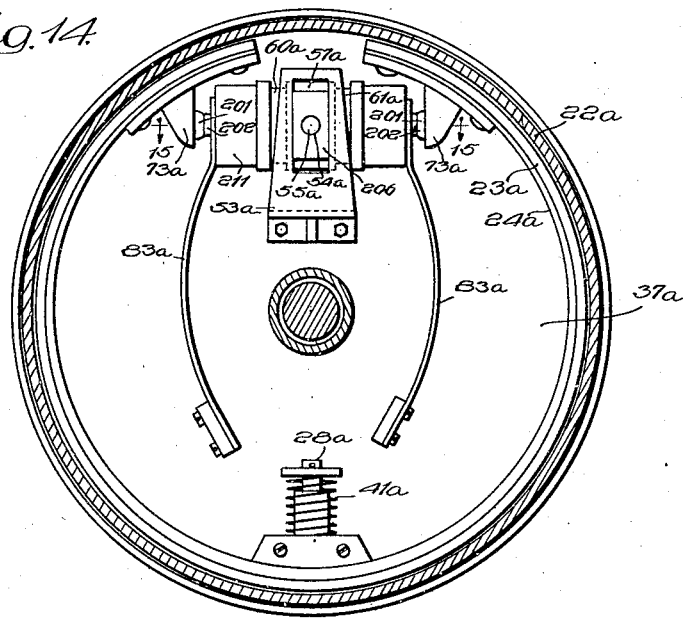
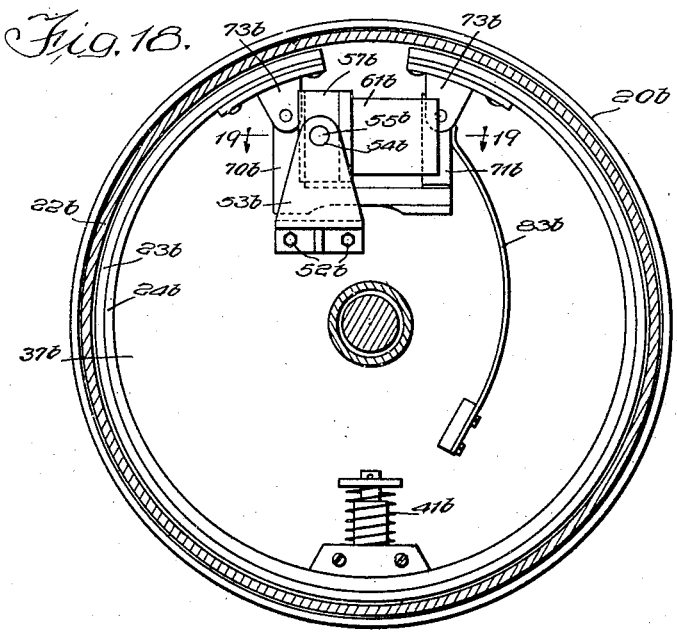

May 10, 1932.                J. W. TATTER                1,857,413
                          FLUID OPERATED APPARATUS
                       Filed Aug. 8, 1927    8 Sheets-Sheet 7
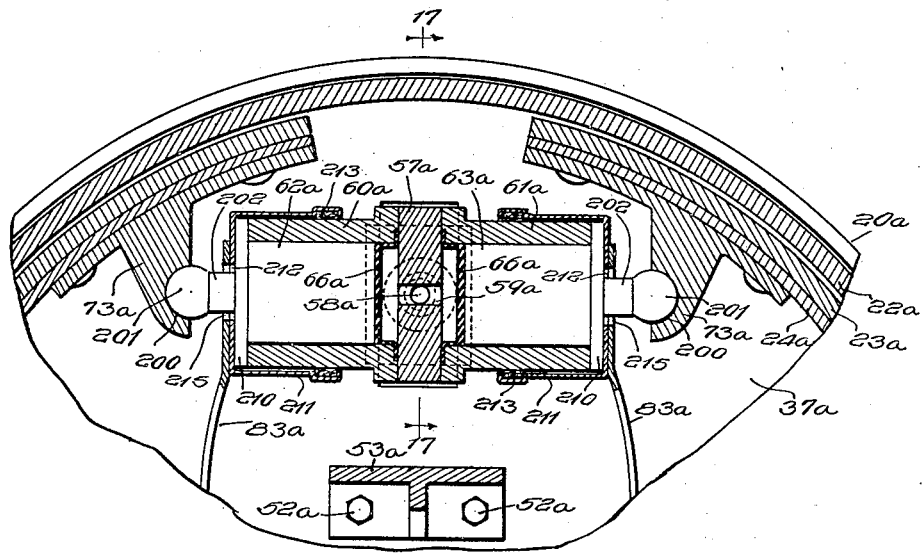
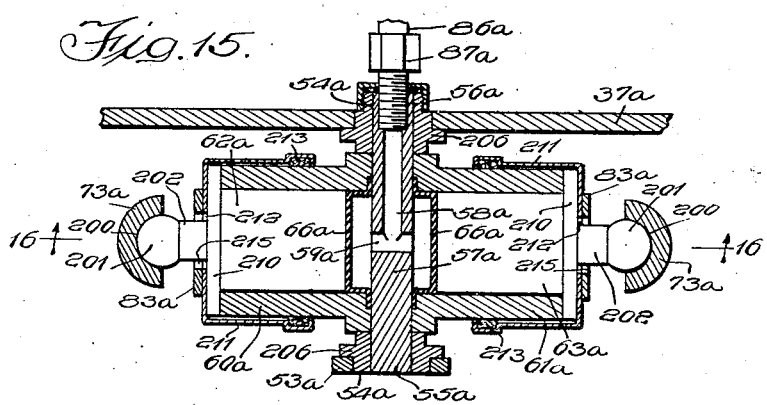
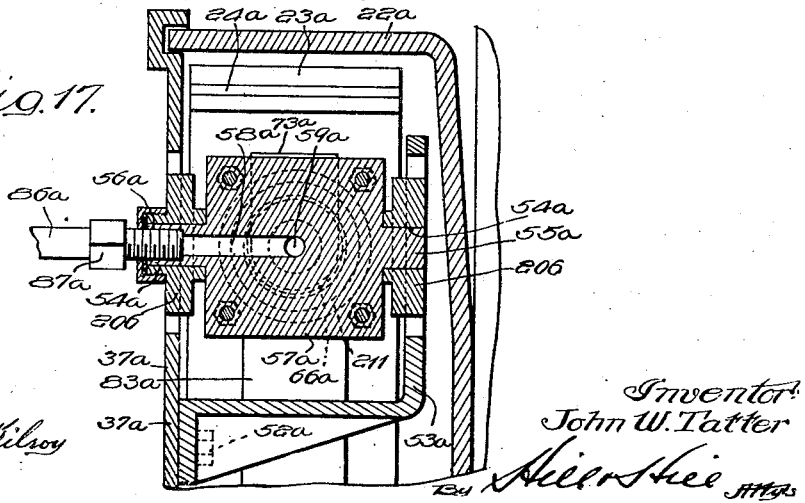
Witness:
William P. Kilroy
Inventor:
John W. Tatter May 10, 1932.  J. W. TATTER  1,857,413
FLUID OPERATED APPARATUS
Filed Aug. 8, 1927   8 Sheets-Sheet 8
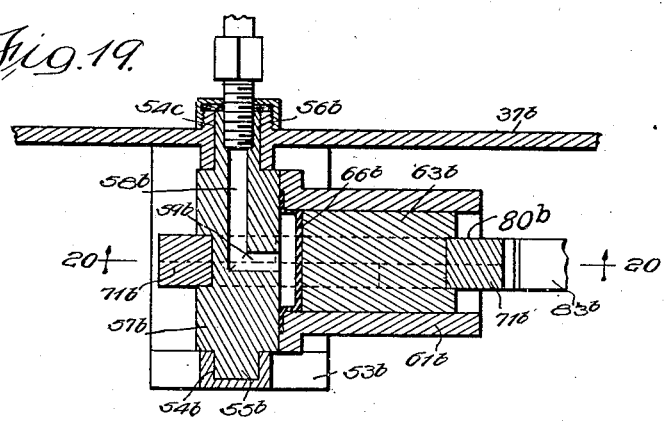
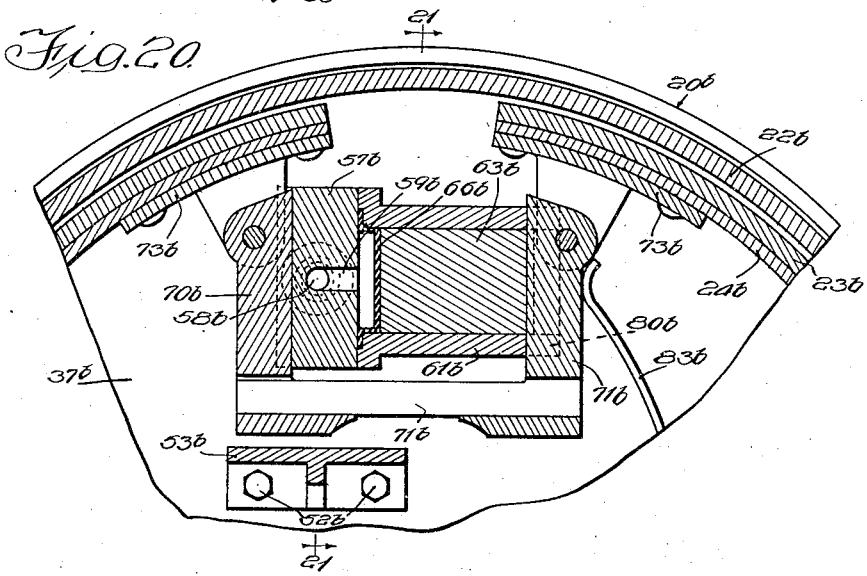
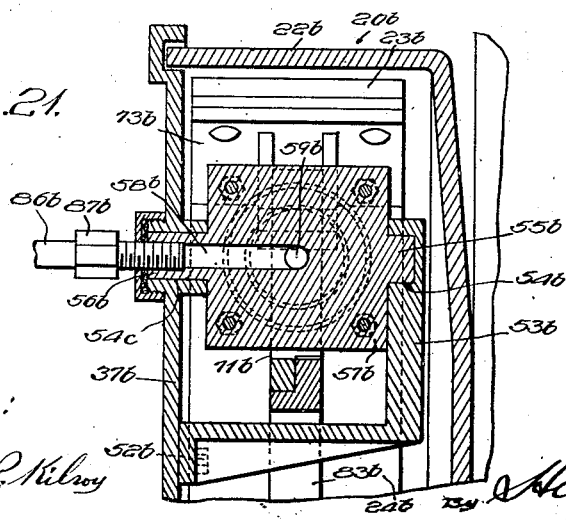
Witness:
William P. Kilroy
Inventor:
John W. Tatter Patented May 10, 1932

1,857,413

UNITED STATES PATENT OFFICE

JOHN W. TATTER, OF CHICAGO, ILLINOIS, ASSIGNOR TO LEWIS DIFFERENTIAL COMPANY, OF CHICAGO, ILLINOIS, A CORPORATION OF ILLINOIS

FLUID OPERATED APPARATUS

Application filed August 8, 1927. Serial No. 211,529.

My invention relates to fluid operated apparatus and has among its other objects the provision of improved braking mechanism.

A particular object of the invention is to provide improved hydraulically operated brake mechanism which is compact, durable, convenient, efficient and satisfactory for use wherever found applicable.

Another particular object of the invention is to provide improved fluid tight construction for fluid operated apparatus.

Another particular object of the invention is to provide improved means for preventing leakage between the wall of a pump cylinder and a piston adapted to be reciprocated therein.

Several forms of the invention are embodied in brake mechanism which comprises improved hydraulically operated apparatus for bringing brake bands, or the equivalent, into effective engagement with brake drums, the hydraulically operated apparatus being adapted to assume positions which insure that substantially the entire brake bands or the linings thereof will contact with the brake drums. The brake mechanisms are connected into systems which include devices whereby partial vacuums may be produced therein to facilitate the task of filling the systems with liquid, and these devices are particularly adapted to be manually manipulated to control the operation of the brake mechanisms and to take up wear of the brake bands on the brake linings thereof. Each of the devices preferably includes improved valve mechanism and means formed from elastic material for preventing leakage of fluid from the device. The hydraulically operated apparatus in the brake mechanisms are also preferably provided with means formed from elastic material for preventing leakage of fluid therefrom and this provision is also preferably made in cylinder and piston constructions which are actuated by the brake levers, or the equivalent, and which in turn cause the braking mechanisms to function.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 3 is a section taken on line 3—3 of Fig. 2;

Fig. 4 is a section taken on line 4—4 of Fig. 2;

Fig. 5 is an enlarged fragmentary elevational view of a portion of the structure illustrated in Fig. 1 and taken substantially as indicated by the line 5—5 thereof.

Fig. 6 is a section taken on line 6—6 of Fig. 5;

Fig. 8 is an enlarged section taken on line 8—8 of Fig. 7;

Fig. 10 is an enlarged section taken on line 10—10 of Fig. 1;

Fig. 11 is a detailed perspective of a guiding member which forms part of the improved apparatus illustrated in Figs. 1 to 12, inclusive;

Fig. 12 is a fragmentary section taken through one of the brake mechanisms shown in Fig. 1;

Fig. 13 is a section taken on line 13—13 of Fig. 12;

Fig. 14 is a section taken through brake mechanism which embodies another form of the invention;

Fig. 15 is an enlarged section taken on line 15—15 of Fig. 14;

Fig. 16 is a section taken on line 16—16 of Fig. 15;

Fig. 17 is a section taken on line 17—17 of Fig. 16;

Fig. 18 is a section taken through brake mechanism which embodies still another form of the invention;

Fig. 19 is an enlarged section taken on line 19—19 of Fig. 18;

Fig. 20 is a section taken on line 20—20 of Fig. 19; and

Fig. 21 is a section taken on line 21—21 of Fig. 20.

Figure 1:
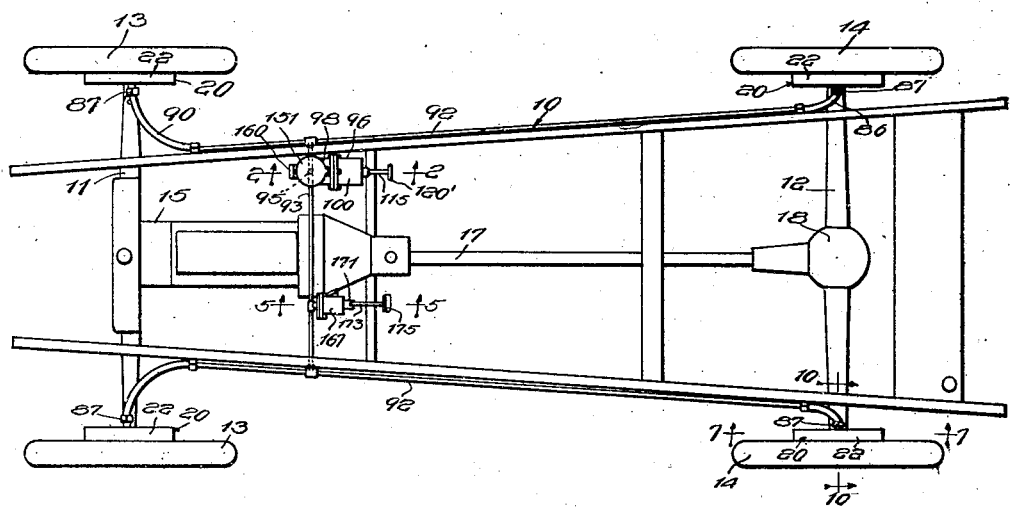
Fig. 1 is a plan elevation of the chassis of an automobile, apparatus embodying the invention being installed upon the chassis.

Referring for the present to Figs. 1 to 13, inclusive, wherein I have illustrated a preferred form of the invention, the reference character 10 designates generally the chassis of an automobile upon which apparatus embodying the invention is installed. As best shown in Fig. 1, the chassis 10 is of well-known construction and preferably comprises a front axle 11 and a rear axle 12, front wheels 13 and rear wheels 14 being mounted upon the front and rear axles 11 and 12, respectively. Mounted upon the chassis 10 is an internal combustion engine 15 adapted to drive the rear wheels 14 through means which includes a propeller shaft 17 and a differential 18. Associated with each of the front wheels 13 and with each of the rear wheels 14 is a brake mechanism 20. The brake mechanisms 20 are preferably substantially identical in construction, but it will be readily understood that the brake mechanisms associated with the front wheels have their various parts secured to the wheels, axles or steering knuckles in a manner somewhat different from the manner in which the other brake mechanisms are secured to the axles and wheels. It is also readily understood that the brake mechanisms may be modified when necessary to permit assembly thereof with various types of axles and wheels and that such modification thereof may be done without much effort by any one skilled in the art.

Figure 7:
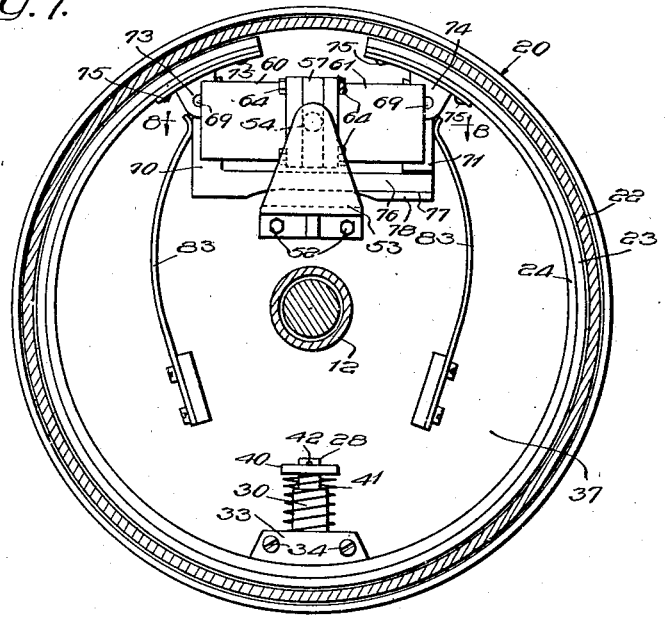
Fig. 7 is an enlarged section taken on line 7—7 of Fig. 1.

As best shown in Fig. 7, each brake mechanism 20 preferably comprises a brake drum 22 which is constrained to rotate with the associated wheel. Engageable with the interior surface of the brake drum 22 is a brake lining 23 mounted upon a brake band 24 of the expanding type. It will be noted that the brake band 24 is relatively thick at its central portion and that it tapers toward the ends thereof. This construction is more fully shown and described in my copending application, Serial No. 145,970 filed November 3, 1926.

Referring to Fig. 12, it will be noted that the brake band 24 has a pin 28 rigidly secured thereto, the pin 28 being arranged substantially radially with respect to the axis of rotation of the brake drum 22. Slidably mounted upon the pin 28 is a member 30 having a frusto-conical surface 31 which is engageable with a frusto-conical surface 32 provided upon a bracket member 33 which is preferably secured by bolts 34, or the equivalent, to a disk 37. As best shown in Fig. 10, the disk 37 may be formed integral with the associated axle. In this instance, I have shown the disk 37 formed integral with the rear axle 12, but it is readily understood that the disks 37 of the front brake mechanism 20 are preferably formed integral with or are secured to the steering knuckles which carry the front wheels 13. Interposed between the member 30 and a cup-shaped washer 40 carried by the pin 28 is a compression spring 41 which urges the frusto-conical surface 31 into engagement with the frusto-conical surface 32. A pin 42 retains the cup-shaped washer 40 upon the pin 28. The purpose of this construction will presently appear.

As best illustrated in Fig. 10, the brake drum 22 is preferably secured by bolts 50, or the equivalent, to one of the rear wheels 14, and the inner end of the brake drum is preferably closed by the associated disk 37. Secured to the disk 37 by bolts 52, or the equivalent, is a bracket 53. A cylindrical recess 54′ formed in the bracket 53 and a bore 54′ formed in the disk 37 journal trunnions 55 and 56, respectively, formed upon a block 57. As shown, the trunnion 56 is provided with a port 58 which communicates with a pair of opposed cylinders 60 and 61 in which pistons 62 and 63, respectively, are slidably mounted. The cylinders 60 and 61 are preferably secured by bolts 64, or the equivalent, to the block 57, and in the preferred embodiments of the invention, sealing disks or cups 66 of resilient and elastic material such as rubber are preferably inserted between the cylinders and the block for a purpose that will presently appear. The outer ends of the pistons 60 and 63 are engageable with guide members 70 and 71, respectively, and the guide members 70 and 71 are pivoted by pins 69, or the equivalent, to brackets 73 and 74, respectively, the brackets 73 and 74 being rigidly secured to the ends of the brake band 24 by rivets 75, or the equivalent. The guide members 70 and 71 are substantially identical in construction, and for this reason, I have illustrated the detailed construction of only one of them in Fig. 11. It will be noted that they are substantially L-shaped and that each of them is provided with a relatively long guide finger 76 adapted to ride in a groove 77 formed in the other guide member. The outer end of each finger 76 is engageable with a lug 78 preferably formed integral with the other guide member. Obviously, this construction prevents angular displacement in a counter-clockwise direction (Fig. 9) of the guide member 71 around its associated pin 69, and prevents angular displacement of the member 70 in a clockwise direction (Fig. 9) around its associated pin 69. This construction resembles that shown in my copending applications, Serial Nos. 145,970 and 203,588 filed Nov. 3, 1926 and July 5, 1927 respectively.

The members 70 and 71 are arranged to ride in slots 80 formed in the cylinders 60 and 61, the arrangement being such that the members cannot be displaced bodily around the longitudinal axis of the cylinders (see Fig. 8). I also preferably provide slots 81 in the outer ends of the pistons 62 and 63, which slots are engaged by the members 70 and 71. A pair of leaf springs 83, or the equivalent, are mounted upon the disk 37 and their free ends are engageable with the members 70 and 71 and are constructed so that they tend to hold the members in engagement with the bottom surfaces of the slots 80.

Screw-threaded into the outer end of the port 58 is a nipple 85 to which one end of a flexible tubular member 86 is secured by a coupling device 87 (see Fig. 10). Referring to Fig. 1, it will be noted that the reference numeral 86 is employed to identify the flexible tubular members operatively connected to the brake mechanisms associated with the rear wheels 14, and that reference numeral 90 is employed to designate tubular members which are operatively connected to the front brake mechanisms 20, additional couplings 87 being provided for this purpose. The tubular members 90 provided upon both sides of the chassis and the tubular members 86 provided upon both sides are preferably connected by tubes 92 to a tube 93 arranged transversely of the chassis.

Figure 2:
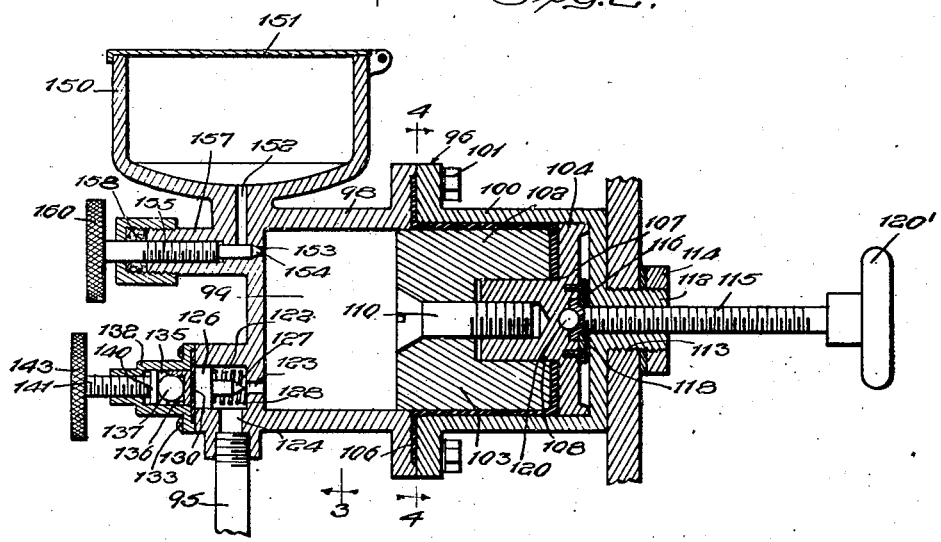
Fig. 2 is an enlarged section taken on line 2—2 of Fig. 1.

The tube 93 is preferably connected by a tube 95 (Figs. 2 and 3), or the equivalent, to a filling and regulating device which is designated generally by the reference character 96 (see Fig. 2).

The filling and regulating device 96 is best illustrated in Fig. 2 and preferably comprises a housing member 98 in which one portion of a cylinder chamber 99 is formed, the remainder of the cylinder chamber 99 being formed in a cylinder cap 100 which is preferably rigidly secured by bolts 101, or the equivalent, to the housing member 98. As shown, that portion of the cylinder 99 formed in the housing member 98 is preferably of smaller diameter than the portion formed in the cylinder cap 100. Disposed in the cylinder chamber 99 is a composite piston 102 which preferably comprises a member 103 slidably journaled in the housing member 98 and a member 104 which is slidably journaled in the cylinder cap 100. The marginal portion of a sealing disk or cup 106 is preferably clamped between the housing member 98 and the cylinder cap 100, and the sealing cup is preferably provided with a substantially central aperture 107 through which a boss 108 formed integral with the member 104 projects. Screw-threaded into the boss and projecting through the member 103 is a screw 110 which rigidly secures the members 103 and 104 to each other in such manner that they clamp the central portion of the sealing cup 106 between them. It will be noted that the reason for leaving an annular space between the member 102 and the interior surface of the cylinder cap 100 is to provide space for the sealing cup 106.

Preferably formed integral with the cylinder cap 100 is a boss 112 adapted to be inserted through an aperture 113 provided upon the dash or the instrument board of the automobile. A nut 114 screw-threaded upon the outer end of the boss 112 rigidly secures the filling and regulating device 96 to the dash or instrument board. A rod 115 screw-threaded into the boss 112 is provided at its inner end with a head 116 which is swiveled to the member 104, an apertured plate 118 being provided for this purpose. It will be noted that a hardened steel ball 120 is preferably interposed between the member 114 and the head 116 and it is readily understood that the ball serves as an anti-friction device. The outer end of the rod 115 is preferably provided with a handle or wheel 120' whereby the rod may be rotated to displace the composite piston 102 in the chamber 99.

A valve chamber 122 formed in the housing member 98 communicates with the cylinder chamber 99 through a port 123. The valve chamber 122 also communicates with the aforementioned tube 95, a port 124 being provided in the housing member 98 for this purpose. Slidably journaled in the valve chamber 122 is a piston or plunger 126 which carries a valve 127 adapted to control the flow of fluid through the port 123. A compression spring 128 disposed in the valve chamber 122 tends to hold the piston or plunger 126 in a position wherein the valve 127 does not obstruct the flow of fluid through the port 123. The outer end of the valve chamber 126 is preferably sealed by a disk 130 which is preferably formed from some elastic material such as rubber, or the equivalent, the disk being preferably clamped between the housing member 98 and a cap member 132 which is rigidly secured to the housing member 98 by screws 133. A cylindrical recess 135 formed in the cap member 132 and aligned with the valve chamber 126 slidably journals a piston or plunger 136 engageable with the sealing disk 133. A hardened steel ball 137 disposed in the recess formed in the plunger or piston 136 serves as an anti-friction bearing between the plunger or piston and a head 140 formed integral with a stem 141, the stem being screw-threaded in the cap member 132. At its outer end, the stem 141 is provided with a knurled head 143 whereby the stem may be rotated to displace the pistons or plungers 136 and 126 against the action of the spring 128.

Preferably formed integral with the housing member 98 is a receptacle 150 provided with a hinged closure member 151. The receptacle 150 communicates with the cylinder chamber 99 through ports 152 and 153. The flow of liquid through the ports 152 and 153 is controlled by valve 154 which is preferably formed integral with a valve stem 155, the valve stem 155 being screw-threaded into a boss 157 which is formed integral with the housing member 98. It will be noted that the valve stem 155 is provided with a packing gland 158 to prevent leakage of liquid from the cylinder chamber 99, and that the outer end of the valve stem 155 is provided with a knurled head 160 whereby the stem may be manipulated to open or close the valve 154.

As best shown in Figs. 5 and 6, the tube 93 communicates with a pipe or tube 162 which communicates with a port 163 formed in a cylinder cap 165, the cylinder cap 165 being secured by bolts 166, or the equivalent, to a cylinder 167. Clamped between the cylinder cap 165 and the cylinder 167 is a sealing member or cup 169 preferably formed from elastic material such as rubber and slidably journaled in the cylinder is a piston 170 which is operatively connected by a link or piston rod 171 to a brake lever 173 which is pivoted upon a shaft 174 suitably mounted in the chassis of the automobile. It will be noted that the lever 173 is provided with the usual foot treadle 175 whereby the lever may be displaced in a counter-clockwise direction (Fig. 5) around its pivotal axis. When not depressed by the driver of the automobile, the brake lever normally rests against a stop 176, or the equivalent, which limits angular displacement in a clockwise direction (Fig. 5).

The operation of the above described apparatus is substantially as follows: Assuming that there is no liquid present in the system and that it is to be suitably filled with liquid so that it will operate satisfactorily, the valves 154 and 127 are first opened and the handle member 120' is rotated to displace the composite piston 102 into a position wherein it engages or lies in close proximity to that wall in which the ports 153 and 123 are formed. The valve 154 is then closed and the handle member 120' is rotated to displace the piston 102 into the position wherein it is shown in Fig. 2 so that a partial vacuum will be developed within the system. The valve 127 is then closed and the valve 154 is opened so that when the handle member 120' is again rotated to displace the piston 102 to the left (Fig. 2) the air remaining in the cylinder chamber 99 will be discharged through the ports 153 and 152. After this discharge of air from the system has been accomplished, the valve 154 is closed and the valve 127 is opened so that a higher degree of vacuum may be obtained in the system by rotating the handle member 120 to bring the piston into the position wherein it is shown in Fig. 2. This sequence of operations may be continued indefinitely to secure a relatively high degree of vacuum in the system, but I generally find it sufficient if I operate the valves in the manner described above and reciprocate the piston four or five times. When the liquid is to be introduced into the system, the valve 154 must be in its closed position and the valve 127 must be open. The piston 102 preferably occupies the position wherein it is shown in Fig. 2. The liquid is poured into the receptacle 150 and the valve 154 is opened, whereupon the liquid is drawn into the system. Of course, the system is preferably completely filled with a suitable liquid such as oil, or the equivalent. It will be readily understood that after the system has been filled with a liquid and the valve 154 has been closed, any displacement of the piston 102 to the left (Fig. 2) will tend to cause a corresponding displacement of the pistons 62, 63 and 170, but as such displacement of the pistons 62 and 63 is resisted by the leaf springs 83 and the brake bands, substantially only the piston 170 will move in unison with the piston 102 until the brake lever 173 rests against the stop 176. If after the brake lever has been brought into engagement with the stop, the piston 102 is again displaced to the left (Fig. 2), the increase in pressure in the system will cause the springs 83 and the brake bands to yield and the pistons 62 and 63 of the several brake mechanisms 20 will be displaced distances substantially proportional to the distance the piston 102 is displaced. This arrangement is exceedingly advantageous in that the brakes may be adjusted at any time by manipulating the handle member 120' to displace the piston 102. Thus, if the brake linings 23 wear to any appreciable extent so that they do not effectively engage the brake drums 22 when the brake lever is depressed, the piston 102 may be displaced to the left (Fig. 2) to displace the several pistons 62 and 63 in such manner that the brake bands 24 will expand and bring the brake linings 23 closer to the brake drums 22. Then when the brake lever 173 is depressed, the brake linings are brought into effective engagement with the brake drums as displacement of the piston 170 toward the left (Fig. 6) causes liquid to be forced into the cylinders 60 and 61 through the ports or passages 69, and the pistons 62 and 63 displace the guide members 70 and 71 which in turn displace the ends of the brake bands 23.

Figure 9:
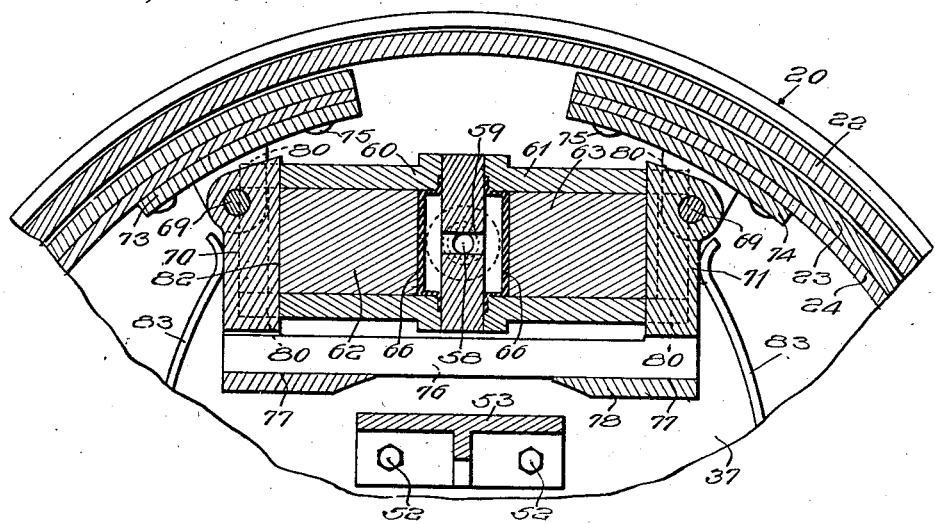
Fig. 9 is a section taken on line 9—9 of Fig. 8.

When the ends of one of the brake bands 23 are displaced in directions away from each other, the improved brake bands expand in the manner set forth in my copending application, Serial No. 145,970 filed November 3, 1926, and substantially the entire exterior arcuate surface of the lining carried by each brake band comes into effective engagement with the associated brake drum at the same instant. Now, if it is assumed that the wheel and brake drum are revolving in a counter-clockwise direction (Fig. 9), it is obvious that the brake drum will tend to rotate the brake band and its lining in the same direction and it will be readily understood that the entire brake band and the entire lining will follow the brake drum until the member 71 engages the bottom surfaces of the slots 80 provided in the cylinder 61. Simultaneously with such displacement of guide members 71, the block 57 and the cylinders 60 and 61 are angularly displaced in a counter-clockwise direction around the pivotal axis of the trunnions 55 and 56 and the frustro-conical surface 41 rides upon the frustro-conical surface 32 against the action of the spring 41. And, of course, while the guide member 71 is being displaced into engagement with the bottom surfaces of the slots 80 provided in the cylinder 61, the piston is displaced to the left (Fig. 9) and causes the liquid in the system to displace the piston 62 in such manner that this piston causes the guide member 70 to hold the lining of the brake band end to which it is secured in engagement with the brake drum. Then, when the brake band and its lining and the mechanism directly connected to the brake band for expanding it come into adjusted positions wherein the band effectively engages the brake drum while the guide member 71 engages the bottom surfaces of the slots 80 provided in the cylinder 61, the pistons 62 and 63 exert equal forces upon the ends of the brake band as the fluid pressures within the cylinders 60 and 61 are equalized. When the brake lever 173 is released, the springs 83 cooperate with the brake bands to restore the pistons 62 and 63 and the guide members 70 and 71 to the positions wherein they are shown in Fig. 9 and the brake lining 23 is disengaged from the brake drum 22. Of course, the compression spring 41 cooperates with the springs 83 in that it functions to return the brake band to the position wherein it is shown in Figs. 7 and 12. In the preferred embodiments of the invention, the brake bands function to some extent as springs and tend to assume a form in which they do not cause the linings to engage the brake drums.

It will be noted that the mechanism illustrated in Fig. 2 functions as a pump when a partial vacuum is being developed in the system, and that after the system has been filled with a suitable liquid, this mechanism may be employed to bring the brake bands into adjusted positions with respect to the brake drums. The sealing member or cup 106 prevents leakage of the liquid from the system through the clearance which is necessarily allowed between the cylindrical surfaces of the composite piston 102 and the interior cylindrical surfaces of the cylinder chamber 99. When the piston is reciprocated within the chamber 99, the elastic material from which the sealing cup 106 is formed permits it to stretch and contract in conformity to the movements of the piston.

The sealing member 130 provided at one end of the valve chamber 122 functions in substantially the same manner as the sealing member 106 in that it prevents liquid from flowing from the valve chamber into the cylindrical recess 135 provided in the cap member 132. The sealing members 169 and 66 also function in the same manner as the sealing cup 106. It will be noted that the sealing disk or cup 169 prevents lubricant from escaping from the cylinder 167 through the clearance between the interior cylinder wall and the piston 170. The sealing members 66 prevent leakage of the liquid past the pistons 62 and 63.

Referring now to Figs. 14 to 17, inclusive, wherein I have shown brake mechanism embodying another form of the invention, the reference character 22a designates a brake drum substantially identical with the aforementioned brake drum 22, and engageable with the brake drum 22a is a brake lining 23a carried by a brake band 24a, the brake band 24a being substantially identical to the aforementioned brake band 24. Rigidly secured to the brake band 24a is a pin 28a which cooperates with mechanism, including a spring 41a, to hold the brake band 24a in an adjusted position in the same manner in which the aforementioned pin 28 and the mechanism, including the spring 41, function to hold the brake band 24 in an adjusted position. These mechanisms are substantially identical in construction. Of course, the spring 41a yields when the brake band 24a is expanded and permits the brake band 24a to be angularly displaced a relatively short distance around the axis of rotation of the brake drum 22a. It is, of course, understood that in this instance, the brake drum 22a is rigidly secured to an automobile wheel (not shown) and the brake band 24 and its lining 23a are carried by a disk 37a which may be substantially identical with the aforementioned disk 37, the disk 37a being rigidly secured to the axle upon which the automobile wheel is mounted.

As best shown in Figs. 15 and 16, bracket members 73a are preferably riveted or otherwise secured to the ends of the brake band 24a, and these bracket members 73a are provided with sockets 200 in which spherical heads 201 formed upon piston rods 202 are journaled. The piston rods 202 are formed integral with or are rigidly secured to pistons 62a and 63a which correspond to the aforementioned pistons 62 and 63, respectively, the pistons 62a and 63a being slidably journaled in cylinders 60a and 61a which are rigidly secured to a block 57a provided with trunnions 55a and 56a. The trunnions 55a and 56a are journaled in bores 54a provided in blocks 206.

One of the blocks 206 is slidably journaled in a bracket 53a secured by bolts 52a, or the equivalent, to the disk 37a, and the other block 206 is slidably journaled in the disk 37a. The arrangement is such that the blocks 206, together with the block 57 and the cylinders 60 and 61, may be moved toward or away from the axis of rotation of the drum 22a. A port 59a extending through the block 57a and communicating with the cylinders 60a and 61a communicates with a port 58a which is connected by a coupling device 87a to a flexible tube 86a.

It is readily understood, of course, that the brake mechanisms illustrated in Figs. 1 to 13, inclusive, may be replaced by brake mechanisms of the type illustrated in Figs. 14 to 17, inclusive, and that when the brake lever 173 is depressed, the tubes 93 and 92 will force liquid under pressure into the cylinders 60a and 61a through the ports 58a and 59a. Sealing members 66a are preferably clamped between the block 57a and the cylinders 60a and 61a, the sealing members 66a being preferably formed of some elastic material such as rubber. In this instance, the sealing members 66a are substantially identical in construction with the sealing members 66.

Annular flanges 210 provided upon the outer ends of the pistons 62a and 63a normally rest upon the outer ends of the cylinders 60a and 61a, and carried by the flanges 210 are cup-shaped members 211 which are provided with apertures 212 to accommodate the piston rods 202. The cup-shaped members 211 preferably carry packing rings 213 engageable with the outer cylindrical surfaces of the cylinders 60a and 61a so that when the pistons 62a and 63a are reciprocated, dust or the like cannot come into contact with cylindrical surfaces of the pistons. The cup-shaped members are held in place upon the annular flanges 210 by leaf springs 83a which resemble the aforementioned leaf springs 83 but differ therefrom in that they are provided with apertures 215 which accommodate the piston rods 202. It is readily understood that the leaf springs 83a function in substantially the same manner as the leaf springs 83 and tend to hold the pistons 62a and 63a in the positions wherein they are shown in Fig. 16.

The operation of the brake mechanism shown in Figs. 14 to 17, inclusive, resembles the operation of the brake mechanism shown in Figs. 1 to 13, inclusive. However, when the brake mechanism shown in Figs. 14 to 17, inclusive, is subjected to fluid pressure so that the brake band 24a will cause its brake lining 23a to effectively engage the brake drum 22a, not only do the cylinders 60a and 61a and the block 57a rotate through a relatively small angle around the pivotal axis of the trunnions 55a, but the blocks 206 also move a relatively short distance toward the axis of rotation of the brake drum 24a carrying the cylinders with them. This arrangement permits the brake band to be quickly brought into a position wherein its brake lining will effectively engage the brake drum throughout its entire length. When this condition obtains, the flange 210 provided upon the piston 63a rests against the outer end of the cylinder 61a, but the piston 63a exerts substantially the same amount of force upon the brake band as the piston 62a.

It will be noted that the brake mechanisms shown in Figs. 1 to 17, inclusive, function equally well no matter which way the associated wheels are revolving. Thus, in the above description of the operation of the apparatus shown in Figs. 14 to 17, inclusive, it is assumed that the brake drum 22a is rotating in a counter-clockwise direction (Fig. 14) so that the flange 210 of the piston 63a will rest upon the outer end of the cylinder 61a when the brake band 24a holds its lining in effective engagement with the brake drum 22a. However, it is readily understood that when the brake drum 22a rotates in a counter-clockwise direction (Fig. 14) and the brake lining effectively engages the brake drum, the flange 210 of the piston 62a engages the outer end of the cylinder 60a while the flange 210 of the piston 63a is spaced from the outer end of the cylinder 61a. Also, when the brake lining 23 shown in Figs. 7 and 9 effectively engages the brake drum 22 while the brake drum is rotating in a clockwise direction, the guide member 70 engages the bottom surfaces of the slots 80 provided in the cylinder 60 and the member 71 is held in a position wherein it is spaced from the bottom surfaces of the slots 80 provided in the cylinder 61.

In Figs. 18 to 21, inclusive, I have shown brake mechanism which embodies still another form of the invention, this brake mechanism being designated generally by the reference character 20b. It will become apparent as this description progresses that brake mechanisms 20b may be employed in place of the brake mechanisms 20a in some instances, if it is so desired, and for the purposes of this description, I have assumed that the brake mechanism 20b illustrated in Figs. 18 to 21 is assembled in a system substantially identical with the liquid pressure system shown in Fig. 1. In Figs. 18 to 21, inclusive, the reference character 22b designates a brake drum engageable by a brake lining 23b which is carried by a brake band 24b, the brake band 24b being substantially identical in construction with the aforementioned brake bands 24 and 24a. Riveted or otherwise secured to the ends of the brake band 24b are bracket members 73b, and pivoted to one of the brake members 73b is a guide member 70b which cooperates with a guide member 71b, the guide members 70b and 71b being substantially identical in construction with the aforementioned guide members 70 and 71. The guide member 71b is adapted to ride in a slot 80b formed in the outer end of a cylinder 61b which is rigidly secured to a block 57b provided with trunnions 55b and 56b which are journaled in a recess 54b and a bore 54c, respectively. The recess 54b is formed in a bracket member 53b which is rigidly secured by bolts 52b, or the equivalent, to a plate 37b which is substantially identical in construction with the aforementioned disk 37. The bore 54c is formed in the disk 37b. Communicating with the cylinder 61b is a port 59b which opens into a port 58b, and the port 58b communicates with a flexible tube 86b through a coupling member 87b. Interposed between the cylinder 61b and the block 57b is a sealing member 66b preferably formed of rubber, or the equivalent. The sealing member 66b prevents leakage of the fluid or liquid from the cylinder by way of the clearance necessarily provided between a piston 63b and the interior cylindrical wall of the cylinder 61b. The piston 63b is engageable with the guide member 71b.

Assuming that the brake drum 22b is rotating in a clockwise direction (Fig. 20) and that the piston 63b is displaced toward the right (Fig. 20) by fluid pressure in the cylinder, it is readily understood that the brake lining 23b will engage the brake drum 22b and will tend to rotate in the same direction as the brake drum. This will cause the cylinder 61b and the block 57b to be angularly displaced as a unit in a clockwise direction (Fig. 20) around the pivotal axis of the trunnions 55b and 56b so that the end of the brake band associated with the guide member 70b will be forced against the brake drum. Of course, this displacement of the piston 63b will be against the action of a spring 83b which performs the same function as the springs 83 shown in Figs. 1 to 13, inclusive, and the brake band will be displaced against the action of a spring 41b which comprises part of mechanism substantially identical to the mechanism comprising the aforementioned spring 41 and pin 28. When the pressure in the cylinder 63b is relieved, the spring 83b and the spring 41 cooperate to return the brake band 24b and the piston 63b to the positions wherein they are shown in Figs. 18 and 20.

Having thus described my invention, it is obvious that various immaterial modifications may be made in the same without departing from the spirit of my invention; hence I do not wish to be understood as limiting myself to the exact form, construction, arrangement, and combination of parts herein shown and described, or uses mentioned.

What I claim as new and desire to secure by Letters Patent is:

1. Brake mechanism comprising, in combination, a brake drum, a brake band engageable with said drum, a pivotally mounted cylinder, a piston mounted therein, a guide member pivotally connected to said brake band and operatively related to said piston in a manner to be moved thereby, means carried by said cylinder and guide member, respectively for securing said member against angular displacement around its pivotal connection and with respect to said cylinder and piston, and means for introducing fluid under pressure into said cylinder to displace said piston.

2. Brake mechanism comprising, in combination, a brake drum, a brake band engageable with said drum, a pivotally mounted cylinder, a piston mounted therein, a guide member operatively related to said piston in a manner to be moved thereby and pivotally connected to said brake band at a point substantially remote from the axial line of said piston, means for securing said guide member against angular displacement around its pivotal connection and with respect to said cylinder and piston, and means for introducing fluid under pressure into said cylinder to displace said piston.

3. Brake mechanism comprising, in combination, a brake drum, a brake band engageable with said drum, a plurality of pivotally mounted cylinders, pistons mounted in said cylinders, a plurality of guide members pivotally connected to said brake band, said guide members being slidably related respectively to said pistons and secured against lateral movement with respect thereto, cooperable means formed on the respective guide members for securing the members against angular displacement around their pivotal connections and with respect to each other, and means for introducing fluid under pressure into said cylinders to displace said pistons.

4. Brake mechanism comprising, in combination, a brake drum, a brake band engageable with said drum, a plurality of pivotally mounted cylinders, pistons mounted in said cylinders, a plurality of guide members pivotally connected to said brake band, said guide members being operatively related respectively to said pistons in a manner to slide with respect thereto in one direction and to be secured against lateral movement with respect thereto in a transverse direction, cooperable means formed on said respective guide means for securing the members against angular displacement around their pivotal connections and with respect to each other, and means for introducing fluid under pressure into said cylinders to displace the said pistons.

5. Brake mechanism comprising, in combination, a brake drum, a brake band engageable with said drum, a plurality of pivotally mounted cylinders, pistons mounted in said cylinders, a plurality of guide members pivotally connected to said brake band, said guide members being operatively related respectively to said pistons in a manner to slide laterally with respect thereto in one direction and to be secured against lateral movement with respect thereto in a transverse direction, cooperable means formed on said respective guide means for securing the members against angular displacement around their pivotal connections and with respect to each other, said cylinders having means formed therein cooperable with said guide members for securing the members against displacement around the longitudinal axis of said cylinders and pistons, and means for introducing fluid under pressure into said cylinders to displace said pistons.

6. Brake mechanism comprising, in combination, a brake drum, a brake band engageable therewith, a plurality of pivotally mounted cylinders, pistons mounted in said cylinders, a plurality of guide members pivotally connected to said brake band and operatively related to said pistons in a manner to be moved thereby, said cylinders having means formed thereon cooperable with said guide members for securing the members against displacement around the longitudinal axis of said cylinders and pistons, and means for introducing fluid under pressure into said cylinders to displace said pistons.

7. Brake mechanism comprising, in combination, a brake drum, a brake band engageable therewith, a plurality of pivotally mounted cylinders, pistons mounted in said cylinders, a plurality of guide members pivotally connected to said brake band and operatively related respectively to said pistons in a manner to be moved thereby, said cylinders having means formed thereon cooperable with said guide members for securing the members against displacement around the longitudinal axis of said cylinders and pistons, cooperable means formed on the respective guide members and operatively related to each other for securing the members against angular displacement around their pivotal connections with said brake band and with respect to said cylinders and pistons, and means for introducing fluid under pressure into said cylinders to displace said pistons.

8. Brake mechanism comprising, in combination, a brake drum, a brake band engageable therewith, a plurality of cylinders, trunnions extending transversely to the longitudinal axis of said cylinders in a manner to provide a pivotal mounting therefor, pistons slidably mounted in said cylinders and operatively connected to said brake band, and means for introducing fluid under pressure through one of said trunnions and into said cylinders to displace said pistons.

9. Brake mechanism comprising, in combination, a brake drum, a brake band engageable therewith, a plurality of cylinders, oppositely disposed trunnions extending substantially radially to the longitudinal axis of said cylinders in a manner to provide a pivotal mounting therefor, pistons slidably mounted in said cylinders and operatively connected to said brake band, and means for introducing fluid under pressure through one of said trunnions and into said cylinders to displace said pistons.

10. Brake mechanism comprising, in combination, a brake drum, a brake band engageable therewith, a plurality of cylinders, oppositely disposed trunnions extending transversely to the longitudinal axis of said cylinders in a manner to provide a pivotal mounting therefor, pistons slidably mounted in said cylinders, a plurality of guide members pivotally connected to said brake band and operatively related respectively to said pistons in a manner to be moved thereby, said cylinders having means formed therein cooperable with said guide members for securing the members against displacement around the longitudinal axis of said cylinders and pistons, cooperable means formed on the respective guide members for securing the members against angular displacement around their pivotal connections with said brake band and with respect to said cylinders and pistons, and means associated with one of said trunnions for introducing fluid under pressure into said cylinders to displace said pistons.

In testimony whereof, I have hereunto signed my name.

JOHN W. TATTER.